United States Patent
Kim et al.

(10) Patent No.: US 10,349,294 B2
(45) Date of Patent: Jul. 9, 2019

(54) EFFICIENT RELAY TRANSMISSION METHOD AND DEVICE IN WIRELESS ACCESS SYSTEM SUPPORTING DEVICE TO DEVICE COMMUNICATION

(71) Applicant: LG ELECTRONICS INC., Seoul (KR)

(72) Inventors: Seonwook Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 15/322,437

(22) PCT Filed: Jun. 26, 2015

(86) PCT No.: PCT/KR2015/006561
§ 371 (c)(1),
(2) Date: Dec. 27, 2016

(87) PCT Pub. No.: WO2015/199490
PCT Pub. Date: Dec. 30, 2015

(65) Prior Publication Data
US 2019/0014490 A1    Jan. 10, 2019

Related U.S. Application Data

(60) Provisional application No. 62/017,847, filed on Jun. 27, 2014.

(51) Int. Cl.
*H04W 24/08* (2009.01)
*H04W 24/02* (2009.01)
(Continued)

(52) U.S. Cl.
CPC .......... *H04W 24/08* (2013.01); *H04W 24/02* (2013.01); *H04W 24/10* (2013.01); *H04W 84/08* (2013.01); *H04W 88/04* (2013.01)

(58) Field of Classification Search
CPC ..... H04W 24/08; H04W 88/04; H04W 24/02; H04W 24/10; H04W 84/08
See application file for complete search history.

(56) References Cited

U.S. PATENT DOCUMENTS

2010/0261469 A1* 10/2010 Ribeiro ................. H04W 99/00
455/423
2013/0029713 A1*  1/2013 Jang ...................... H04W 24/10
455/517
(Continued)

FOREIGN PATENT DOCUMENTS

KR    1020140073346    6/2014
WO    2011118912       9/2011
(Continued)

OTHER PUBLICATIONS

PCT International Application No. PCT/KR2015/006561, Written Opinion of the International Searching Authority dated Oct. 19, 2015, 17 pages.

*Primary Examiner* — Jianye Wu
(74) *Attorney, Agent, or Firm* — Lee Hong Degerman Kang & Waimey

(57) ABSTRACT

The present invention relates to a method for efficiently transmitting and receiving a device to device (D2D) signal by utilizing relay user equipment (rUE) in a wireless access system supporting D2D communication. As one embodiment of the present invention, a method by which rUE efficiently relays a D2D signal in a wireless access system supporting D2D communication can comprises the steps of: receiving, from a base station, an upper layer signal including a reference value for measuring signal quality; measur-
(Continued)

ing signal quality for at least one access link; selecting an access link to be relayed on the basis of the reference value; and relaying a D2D signal for the selected access link.

12 Claims, 18 Drawing Sheets

(51) Int. Cl.
  *H04W 24/10* (2009.01)
  *H04W 84/08* (2009.01)
  *H04W 88/04* (2009.01)

(56) References Cited

U.S. PATENT DOCUMENTS

2014/0127991 A1* 5/2014 Lim .................. H04W 76/14
  455/39
2014/0286293 A1* 9/2014 Jang .................. H04L 5/0044
  370/329

FOREIGN PATENT DOCUMENTS

| WO | 2012177002 | 12/2012 |
| WO | 2013077684 | 5/2013 |

* cited by examiner

FIG. 9
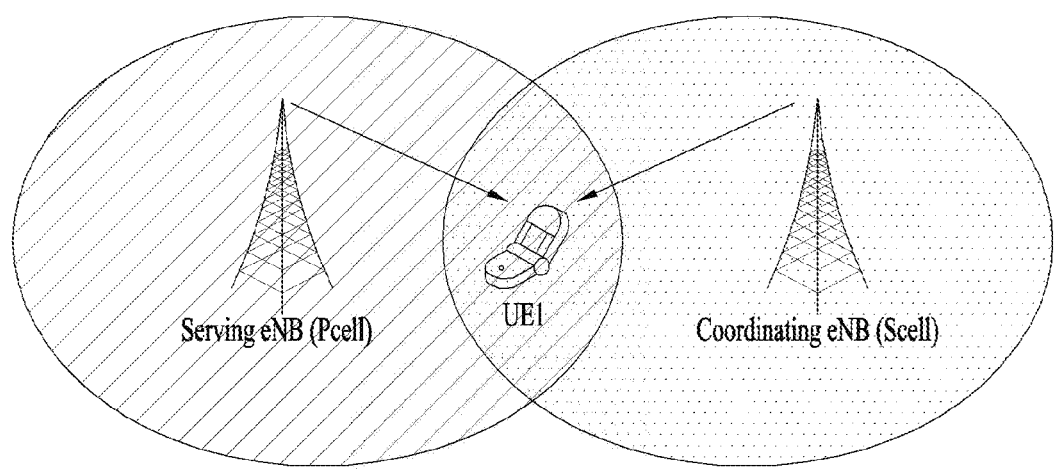
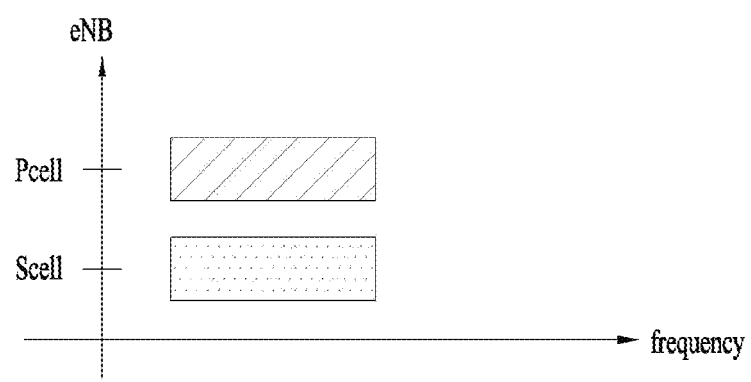

EFFICIENT RELAY TRANSMISSION METHOD AND DEVICE IN WIRELESS ACCESS SYSTEM SUPPORTING DEVICE TO DEVICE COMMUNICATION

CROSS-REFERENCE TO RELATED APPLICATIONS

This application is the National Stage filing under 35 U.S.C. 371 of International Application No. PCT/KR2015/006561, filed on Jun. 26, 2015, which claims the benefit of U.S. Provisional Application No. 62/017,847, filed on Jun. 27, 2014, the contents of which are all hereby incorporated by reference herein in their entirety.

TECHNICAL FIELD

The present invention relates to a method of efficiently transmitting and receiving a D2D (device to device) signal by utilizing a relay user equipment (rUE) in a wireless access system supporting D2D communication, and more particularly, to a method of reducing unnecessary D2D data retransmission in a backhaul link or an access link and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method of efficiently supporting D2D relay communication in a wireless access system supporting the D2D relay communication.

Another object of the present invention is to provide various methods of preventing duplicated transmission of relay data when D2D communication performed.

Another object of the present invention is to provide a method of preventing duplicated transmission of relay data by a coordination between relay UEs.

The other object of the present invention is to provide devices supporting the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a method of efficiently transmitting and receiving a D2D (device to device) signal by utilizing a relay user equipment (rUE) in a wireless access system supporting D2D communication, and more particularly, to a method of reducing unnecessary D2D data retransmission in a backhaul link or an access link and an apparatus supporting the same To achieve these and other advantages and in accordance with the purpose of the present invention, as embodied and broadly described, according to one embodiment, a method of efficiently relaying a D2D signal, which is relayed by a relay a user equipment (UE) in a wireless access system supporting device to device (D2D) communication, includes the steps of receiving a higher layer signal including a reference value for measuring signal quality from an eNB, measuring signal quality of one or more access links, selecting an access link to be relayed on the basis of the reference value, and relaying a D2D signal for the selected access link. In this case, the one or more access links may correspond to a link between the relay UE and one or more general UEs.

To further achieve these and other advantages and in accordance with the purpose of the present invention, according to a different embodiment, a relay user equipment (UE) efficiently relaying a D2D signal in a wireless access system supporting device to device (D2D) communication can include a transmitter, a receiver, and a processor configured to support the relay of the D2D signal.

In this case, the processor is configured to control the receiver to receive a higher layer signal containing a reference value for measuring signal quality from an eNB, configured to control the receiver to measure signal quality of one or more access links, configured to select an access link to be relayed on the basis of the reference value, configured to control the transmitter and the receiver to relay a D2D signal for the selected access link. In this case, the one or more access links may correspond to a link between the relay UE and one or more general UEs.

The signal quality can be measured using a UE-specific reference signal transmitted from the one or more access links.

The higher layer signal can further include at least one of a source identifier and a destination identifier.

In this case, in case of performing uplink transmission, the relay UE can be configured to relay a D2D signal for a UE of which the source identifier is matched only among the selected access link.

And, in case of performing downlink transmission, the relay UE can be configured to relay a D2D signal for a UE of which the destination identifier is matched only among the selected access link.

The relay UE can exchange first access link information containing a UE identifier and signal quality associated with the selected access link with second access link information of a different relay UE. In this case, the relay UE may not relay a D2D signal for a link relayed by the different relay UE on the basis of the second access link information.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, it is able to efficiently support D2D relay communication in a wireless access system supporting the D2D relay communication.

Second, it is able to prevent duplicated transmission of relay data by selecting a UE or a link to be relayed based on reference information such as signal quality of an access link, a source identifier, a destination identifier, and the like when D2D communication is performed.

Third, it is able to prevent duplicated transmission of relay data via coordination between relay UEs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

BEST MODE

Mode for Invention

Figure 1:
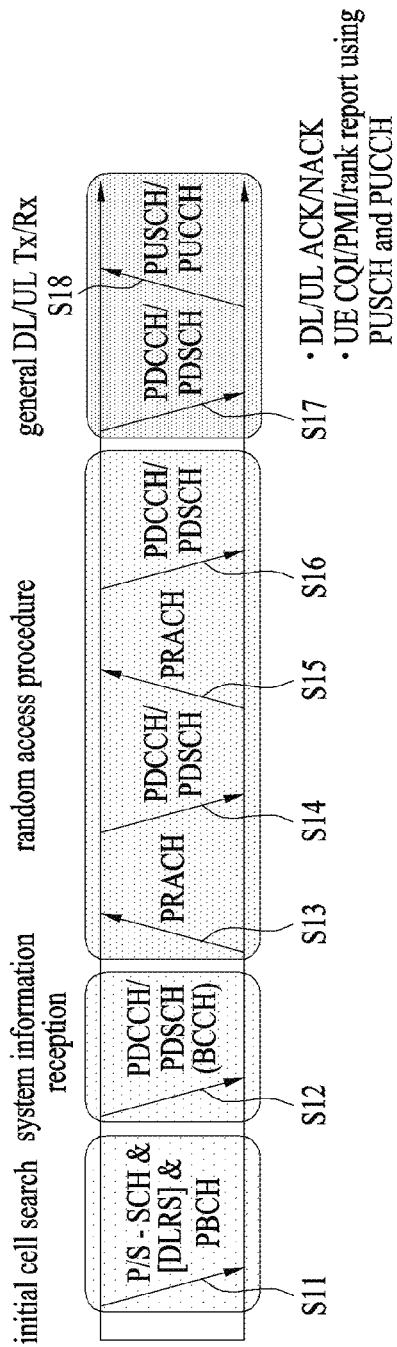
FIG. 1 is a conceptual diagram illustrating physical channels used in the embodiments and a signal transmission method using the physical channels.

In the following, a method of efficiently transmitting and receiving a D2D signal by utilizing a relay UE (rUE) and apparatuses supporting the same are explained according to embodiments of the present invention.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
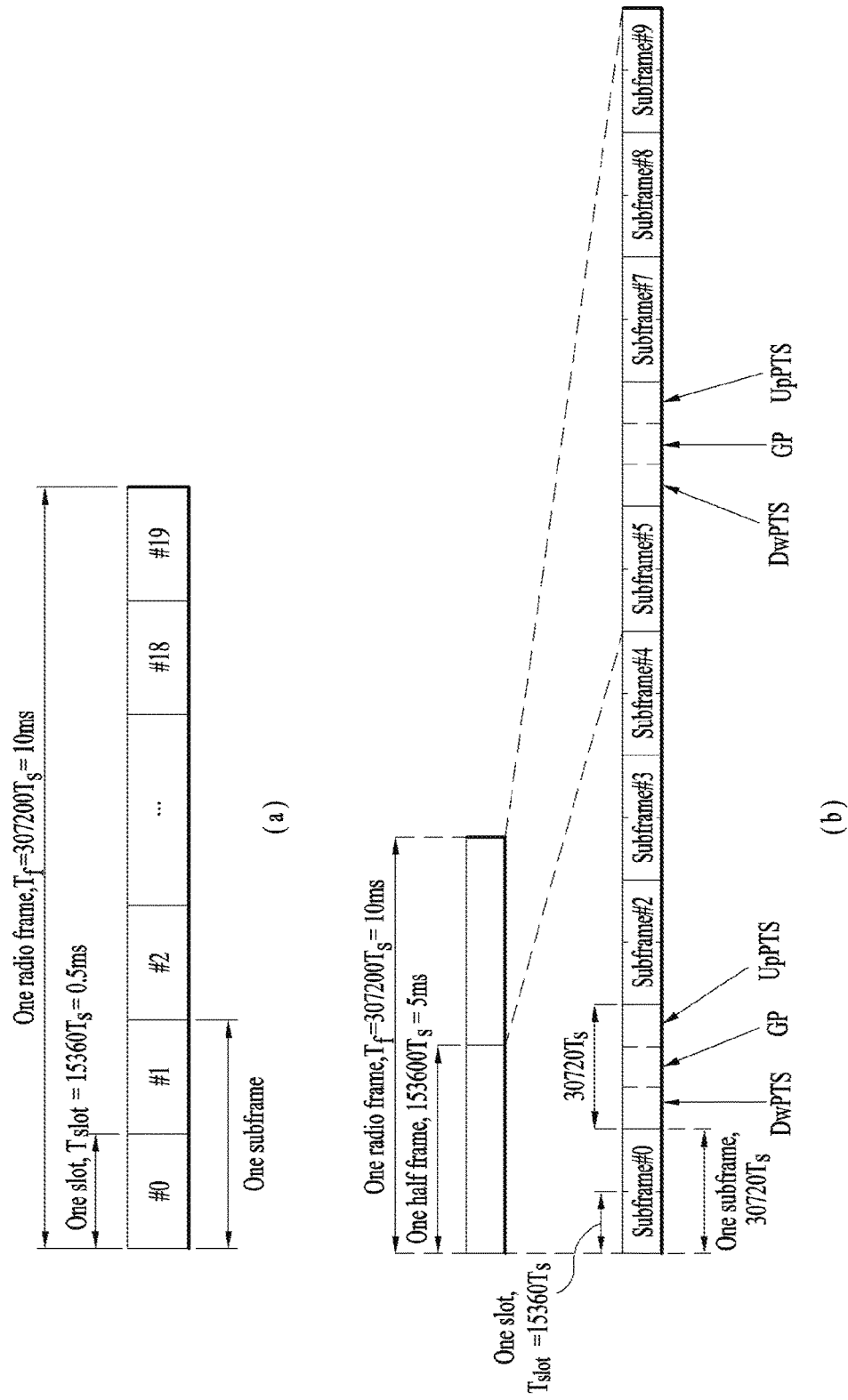
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
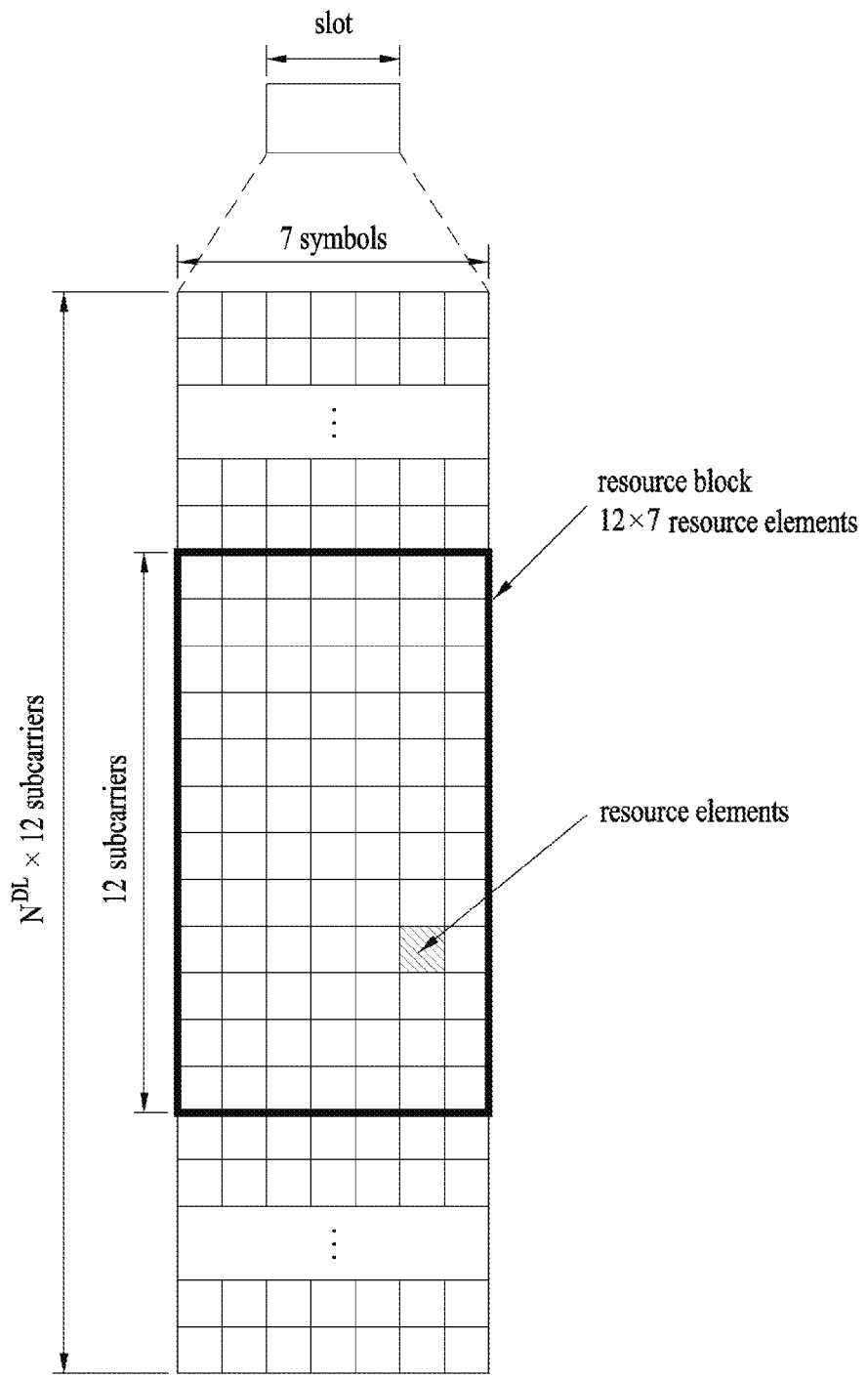
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
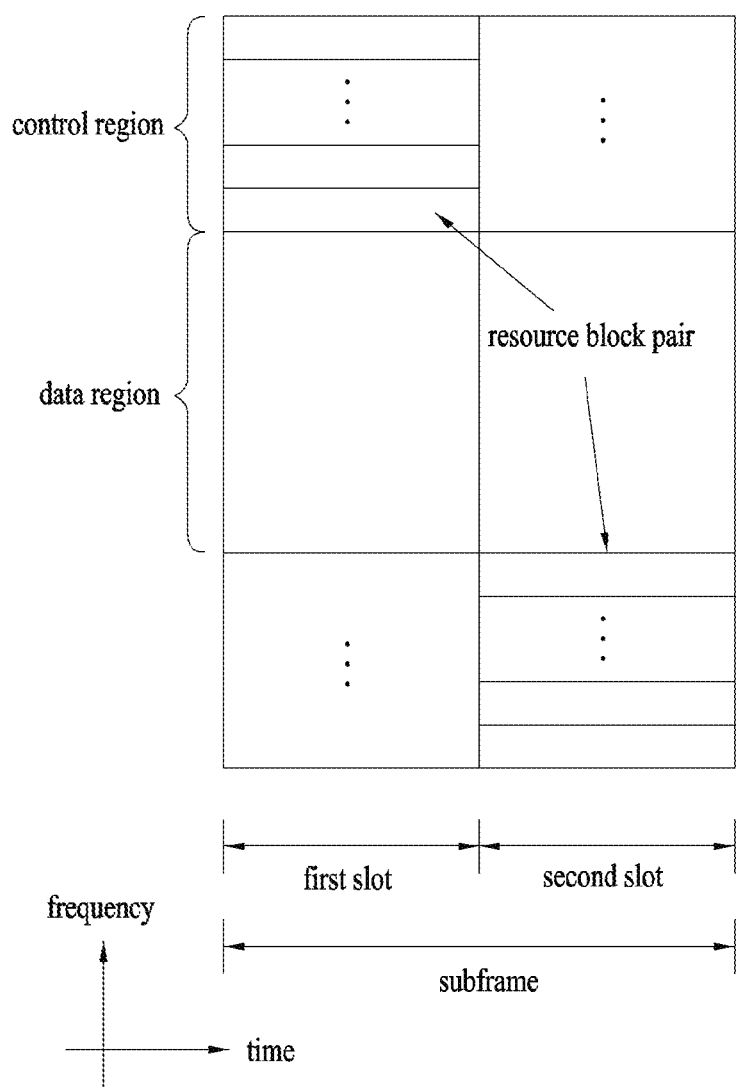
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
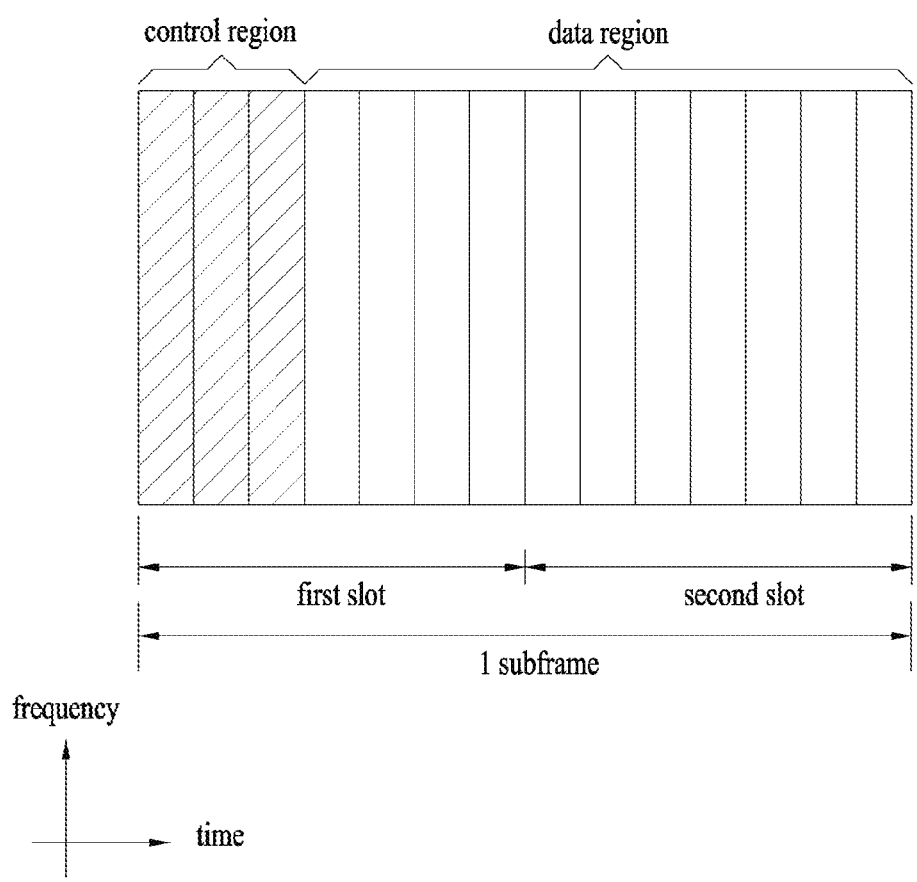
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

1.2 Physical Downlink Control Channel (PDCCH)
1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |

TABLE 4-continued

| PDCCH format | Number of CCEs (n) | Number of candidates in common search space | Number of candidates in dedicated search space |
|---|---|---|---|
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\} + i \quad \text{[Equation 1]}$$

where $M^{(L)}$ is the number of PDCCH candidates with CCE aggregation level L to be monitored in the SS, m=0, . . . , $M^{(L)}$−1, is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
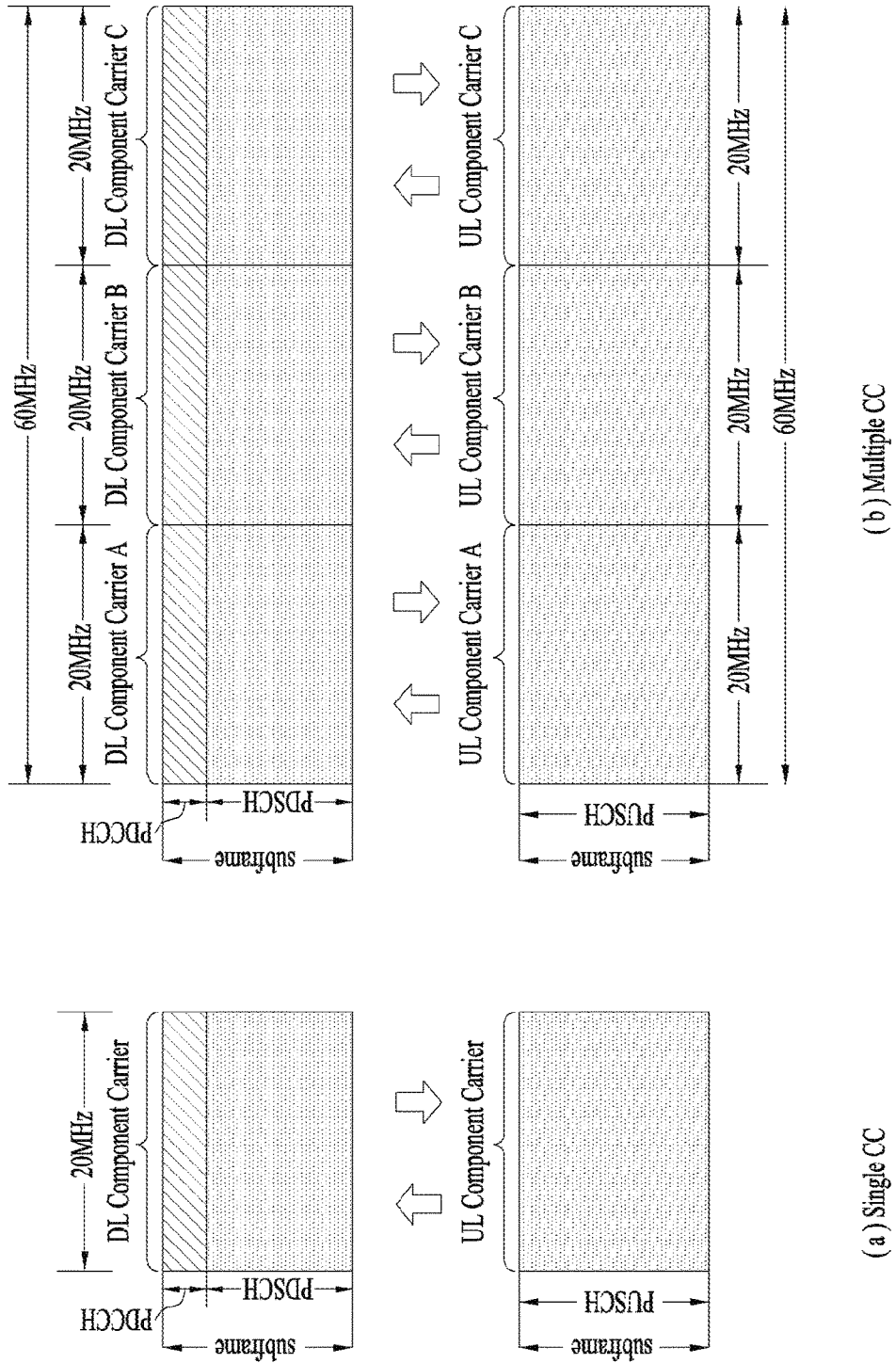
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
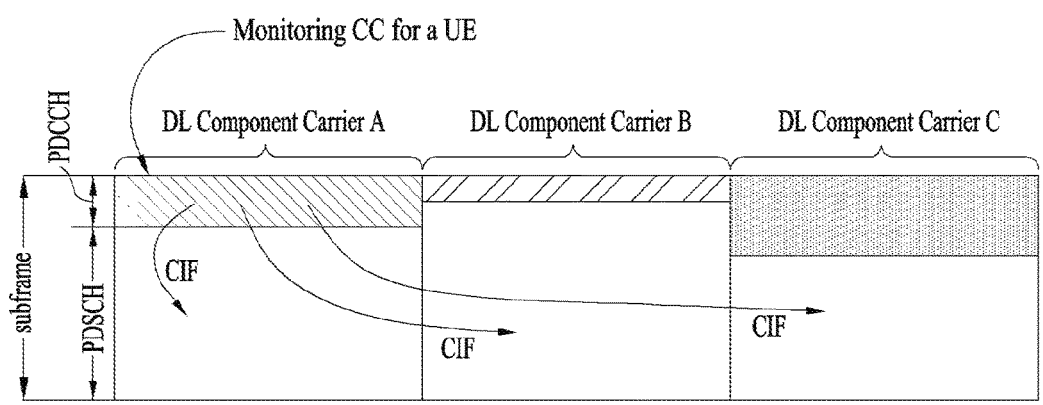
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
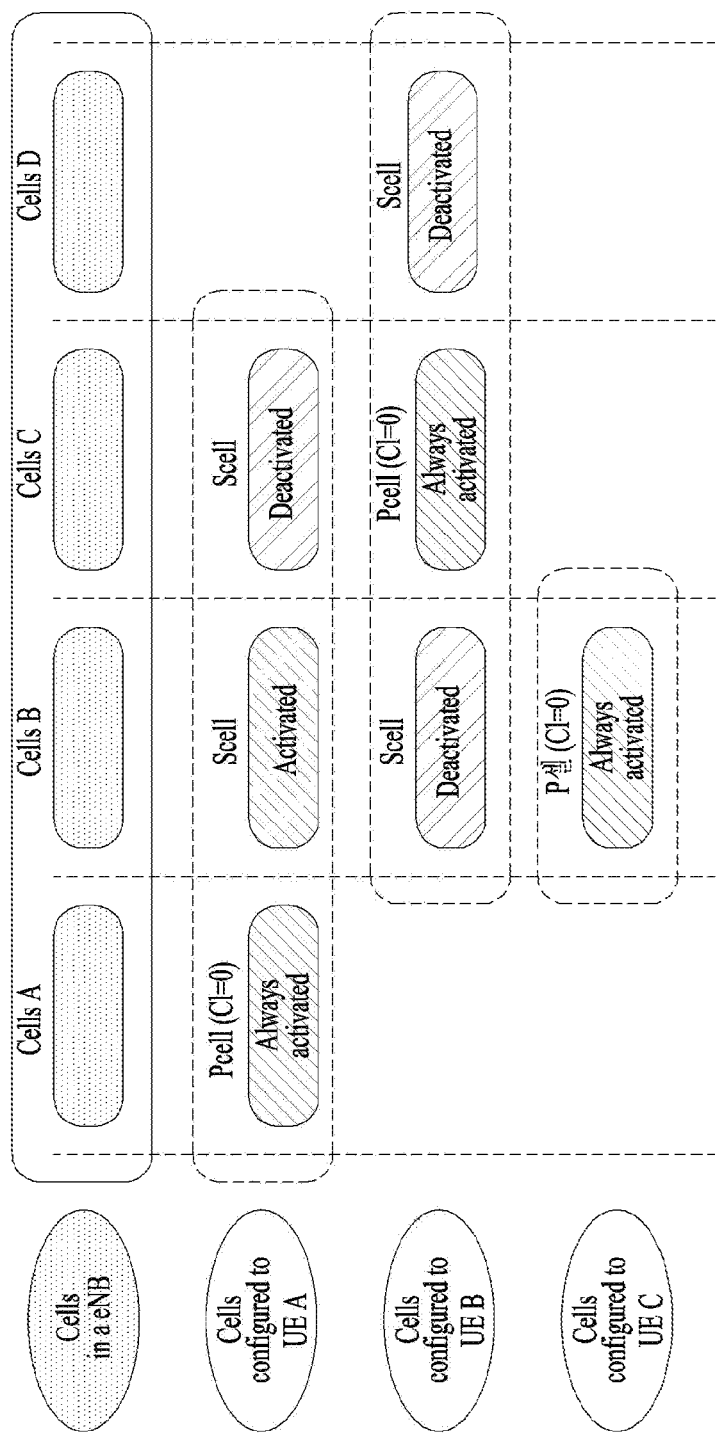
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2. 4 Reference Signal (RS)

Hereinafter, reference signals that can be used in the embodiments of the present invention will be described.

Figure 10:
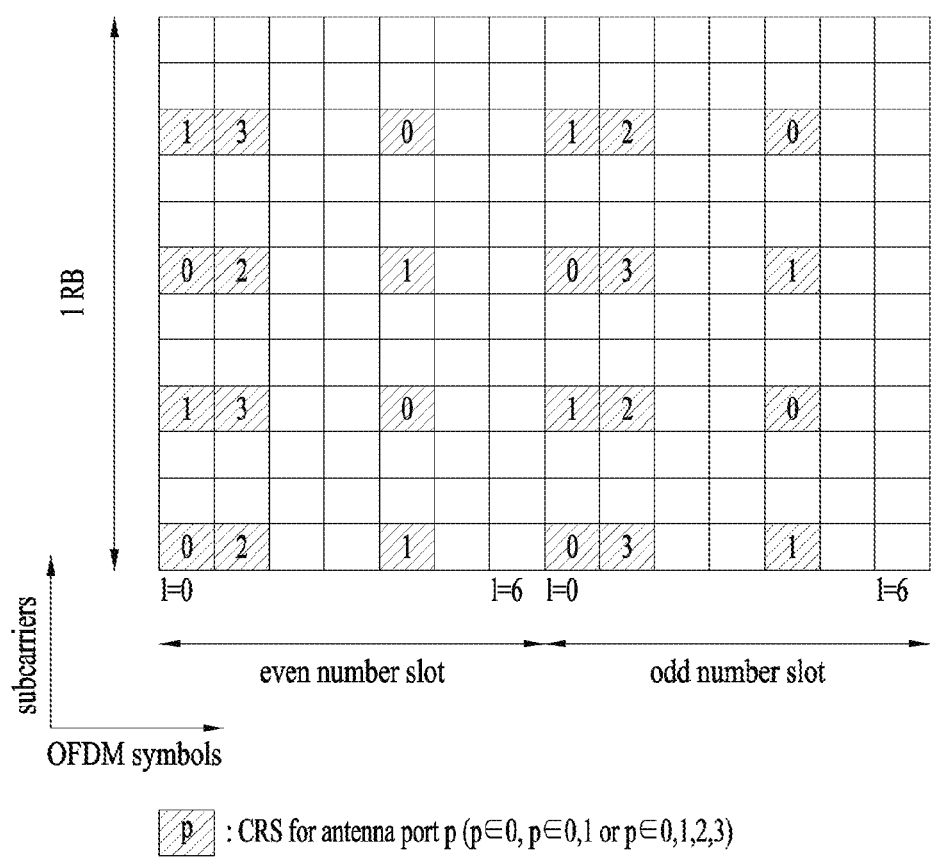
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2. 5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/ scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
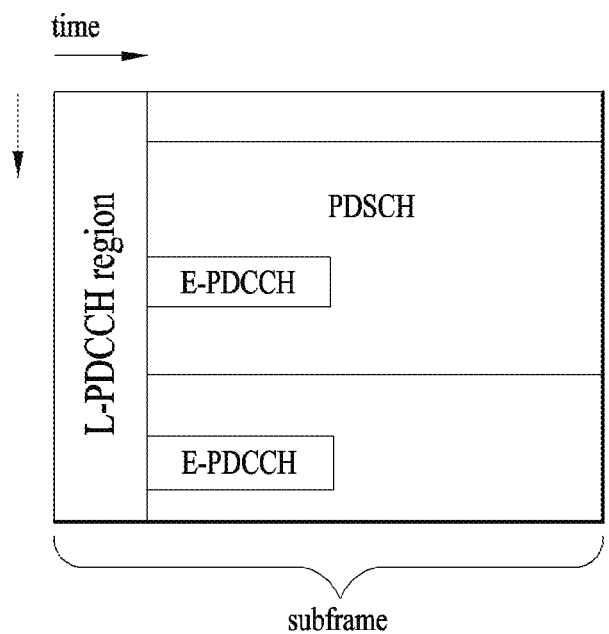
FIG. 11 illustrates an example that legacy PDCCH, PDSCH and E-PDCCH, which are used in an LTE/LTE-A system, are multiplexed.
Figure 12:
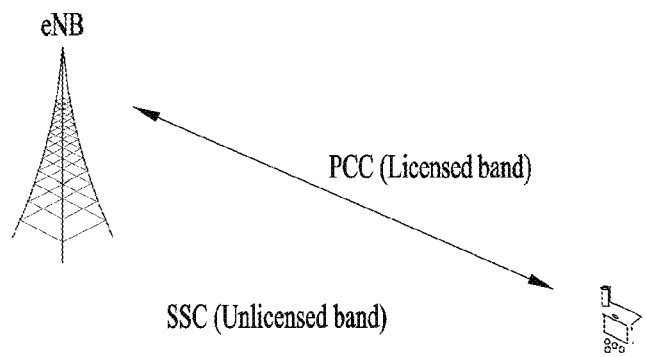
FIG. 12 illustrates an example of a CA environment supported in an LTE-U system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

2.6 CSI Feedback on PUCCH

First of all, in the 3GPP LTE system, when a DL reception entity (e.g., a UE) is connected to a DL transmission entity (e.g., a BS), the DL reception entity performs measurement on a Reference Signal Received Power (RSRP) of a reference signal transmitted in DL, a quality of a reference signal Reference Signal Received Quality (RSRQ) and the like at a random time and is then able to make a periodic or even-triggered report of a corresponding measurement result to the base station.

Each UE reports a DL channel information in accordance with a DL channel status via uplink. A base station is then able to determine time/frequency resources, MCS and the like appropriate for a data transmission to each UE using the DL channel information received from the each UE.

Such CSI may include CQI, Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a base station.

In case of the aperiodic report, it is set for each UE by a 1-bit request bit (CQI request bit) contained in UL scheduling information downloaded to a UE by a base station. Having received this information, each UE is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the PUCCH but on a PUSCH. In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 6 is provided to describe CSI feedback type transmitted on PUCCH and PUCCH CSI report mode.

TABLE 6

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to Table 6, in the periodic report of channel information, there are 4 kinds of reporting modes (mode 1-0, mode 1-2, mode 2-0 and mode 2-1) in accordance with CQI and PMI feedback types.

CQI can be classified into Wideband (WB) CQI and Subband (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a 1st codeword can be transmitted.

The mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set $\{-4, -3, -2, -1, 0, 1, 2, 3\}$ and can be represented as 3 bits.

The mode 2-0 corresponds to a case that CQI on a UE-selected band is transmitted in the absence of PMI transmission. In this case, RI is transmitted only in case of OL SM and a WB CQI represented as 4 bits may be transmitted. A best CQI (best-1) is transmitted on each Bandwidth Part (BP) and the best-1 CQI may be represented as 4 bits. And, an L-bit indicator indicating the best-1 may be transmitted together. If the RI is greater than 1, a CQI for a 1st codeword can be transmitted.

And, the mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each BP and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a UE is set to make a PMI/RI reporting, or Modes 1-0 and 2-0 if a UE is set not to make a PMI/RI reporting
9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, the mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a BP corresponding to a portion of a bandwidth of a serving cell. An index is given to the bandwidth part in a frequency increasing order starting with a lowest frequency without an increment of a bandwidth.

$N_{RB}^{DL}$ Indicates the number of RBs of a serving cell system bandwidth. The system bandwidth may be divided into N (1, 2, 3, ... N) SB CQI subbands. One SB CQI may include k RBs defined in Table 15. If the number of RBs of the whole bandwidth is not a multiple integer of k ($\lceil N_{RB}^{DL}/k \rceil - \lfloor N_{RB}^{DL}/k \rfloor > 0$) the number of RBs configuring a last (i.e., Nth) SB CQI may be determined by [Equation 3].

$$N_{RB}^{DL} - k \cdot \lfloor N_{RB}^{DL}/k \rfloor \qquad \text{[Equation 3]}$$

Table 7 shows relationship among subband size k, BP and system bandwidth $N_{RB}^{DL}$.

TABLE 7

| System Bandwidth $N_{RB}^{DL}$ | Subband Size k (RBs) | Bandwidth Parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

Moreover, $N_J$ CQI subbands configure one bandwidth part (BP) and a system bandwidth can be divided into J BPs. If J=1, $N_J$ is equal to $\lceil N_{RB}^{DL}/k/J \rceil$. If J>1, NJ is equal to $\lceil N_{RB}^{DL}/k/J \rceil$ or $\lceil N_{RB}^{DL}/k/J \rceil - 1$. A UE calculates a CQI index for a preferred best one (best-1) CQI band in BP and may be then able to transmit the CQI index on PUCCH. In doing so, a best-1 indicator indicating what is the best-1 CQI subband selected from one BP may be transmitted together. The best-1 indicator may be configured with L bits, where the 'L' can be represented as [Equation 4].

$$L = \lceil \log_2 \lceil N_{RB}^{DL}/k/J \rceil \rceil \qquad \text{[Equation 4]}$$

In the above UE-selected CQI reporting mode, it is able to determine a frequency band in which a CQI index is calculated.

In the following description, a CQI transmission period is explained.

Table 7 shows CQI and PMI payload sizes of each PUCCH CSI report mode.

TABLE 7

| PUCCH Format | Reported | Mode State | PUCCH Reporting Modes | | | |
| --- | --- | --- | --- | --- | --- | --- |
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |

TABLE 7-continued

| PUCCH Format | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/ second PMI | 8 antenna ports RI = 1 | 8 | — | NA | NA |
| | | 8 antenna ports 1 < RI ≤ 4 | 11 | — | NA | NA |
| | | 8 antenna ports 4 < RI ≤ 7 | 9 | — | NA | NA |
| | | 8 antenna ports RI = 8 | 7 | — | NA | NA |
| 3 | RI | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

Referring to Table 7, each CQI/PMI and RI reporting type (PUCCH reporting type) supported for PUCCH CSI report mode can be described as follows.

Reporting Type 1 supports CQI feedback for a subband selected by a UE.

Reporting Type 1a supports subband CQI and 2nd PMI feedback.

Reporting Type 2/2b/2c supports WB CQI and PMI feedback.

Reporting Type 2a supports WB PMI feedback.

Reporting Type 3 supports RI feedback.

Reporting Type 4 supports WB CQI.

Reporting Type 5 supports RI and WB PMI feedback.

Reporting Type 6 supports RI and PTI feedback.

A UE can receive information including a combination of a transmission period of channel information and an offset from an upper layer by RRC signaling. The UE can transmit the channel information to a base station based on the provided information on the channel information transmission period. In each serving cell, a period Npd in a subframe for a CQI/PMI reporting and an offset $N_{OFFSET,CQI}$ in the subframe are determined based on a parameter 'cqi-pmi-ConfigIndex' ($I_{CQI/PMI}$) set up by upper layer signaling [cf. Table 8 and Table 9]. An offset $N_{OFFSET,RI}$ related to a period MRI for an RI reporting is determined based on a parameter 'ri-ConfigIndex' ($I_R$) [cf. Table 16]. The offset $N_{OFFSET,RI}$ for the RI reporting has a value of $\{0, -1 \ldots -(N_{pd}-1)\}$ In case that a UE is set to report abnormality of one CSI subframe set, the 'cqi-pmi-ConfigIndex' and the 'ri-ConfigIndex' correspond to the period and offset of CQI/PMI and RI for a subframe set 1, respectively. And, the 'cqi-pmi-ConfigIndex2' and the 'ri-ConfigIndex2' correspond to the period and offset of CQI/PMI and RI for a subframe set 2, respectively.

Table 8 shows the mapping relation between Npd and NOFFSET,CQI of a parameter ICQI/PMI in FDD.

TABLE 8

| $I_{CQI/PMI}$ | Value of $N_{pd}$ | Value of $N_{OFFSET,CQI}$ |
|---|---|---|
| 0 ≤ $I_{CQI/PMI}$ ≤ 1 | 2 | $I_{CQI/PMI}$ |
| 2 ≤ $I_{CQI/PMI}$ ≤ 6 | 5 | $I_{CQI/PMI}$ − 2 |
| 7 ≤ $I_{CQI/PMI}$ ≤ 16 | 10 | $I_{CQI/PMI}$ − 7 |
| 17 ≤ $I_{CQI/PMI}$ ≤ 36 | 20 | $I_{CQI/PMI}$ − 17 |
| 37 ≤ $I_{CQI/PMI}$ ≤ 76 | 40 | $I_{CQI/PMI}$ − 37 |
| 77 ≤ $I_{CQI/PMI}$ ≤ 156 | 80 | $I_{CQI/PMI}$ − 77 |
| 157 ≤ $I_{CQI/PMI}$ ≤ 316 | 160 | $I_{CQI/PMI}$ − 157 |
| $I_{CQI/PMI}$ = 317 | | Reserved |
| 318 ≤ $I_{CQI/PMI}$ ≤ 349 | 32 | $I_{CQI/PMI}$ − 318 |
| 350 ≤ $I_{CQI/PMI}$ ≤ 413 | 64 | $I_{CQI/PMI}$ − 350 |
| 414 ≤ $I_{CQI/PMI}$ ≤ 541 | 128 | $I_{CQI/PMI}$ − 414 |
| 542 ≤ $I_{CQI/PMI}$ ≤ 1023 | | Reserved |

Table 9 shows the mapping relation between Npd and NOFFSET,CQI of a parameter ICQI/PMI in TDD.

TABLE 9

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | | Reserved |

Table 10 shows the mapping relation between MRI and NOFFSET,RI of a parameter IRI in TDD.

TABLE 10

| $I_{RI}$ | Value of $M_{RI}$ | Value of $N_{OFFSET,RI}$ |
|---|---|---|
| $0 \leq I_{RI} \leq 160$ | 1 | $-I_{RI}$ |
| $161 \leq I_{RI} \leq 321$ | 2 | $-(I_{RI} - 161)$ |
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 804$ | 16 | $-(I_{RI} - 644)$ |
| $805 \leq I_{RI} \leq 965$ | 32 | $-(I_{RI} - 805)$ |
| $966 \leq I_{RI} \leq 1023$ | | Reserved |

2.7 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 11 illustrates an example of a higher-layer signal that configures CSI subframe sets.

TABLE 11

```
CQI-ReportConfig-r10 ::= SEQUENCE {
    cqi-ReportAperiodic-r10          CQI-ReportAperiodic-r10    OPTIONAL, -- Need ON
    nomPDSCH-RS-EPRE-Offset          INTEGER (-1..6),
    cqi-ReportPeriodic-r10           CQI-ReportPeriodic-r10     OPTIONAL, -- Need ON
    pmi-RI-Report-r9                 ENUMERATED {setup}         OPTIONAL, -- Cond
PMIRIPCell
    csi-SubframePatternConfig-r10    CHOICE {
        release                          NULL,
        setup                            SEQUENCE {
            csi-MeasSubframeSet1-r10        MeasSubframePattern-r10,
            csi-MeasSubframeSet2-r10        MeasSubframePattern-r10
        }
    }
                                                                OPTIONAL    -- Need ON
}
```

Table 11 illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

Figure 13:
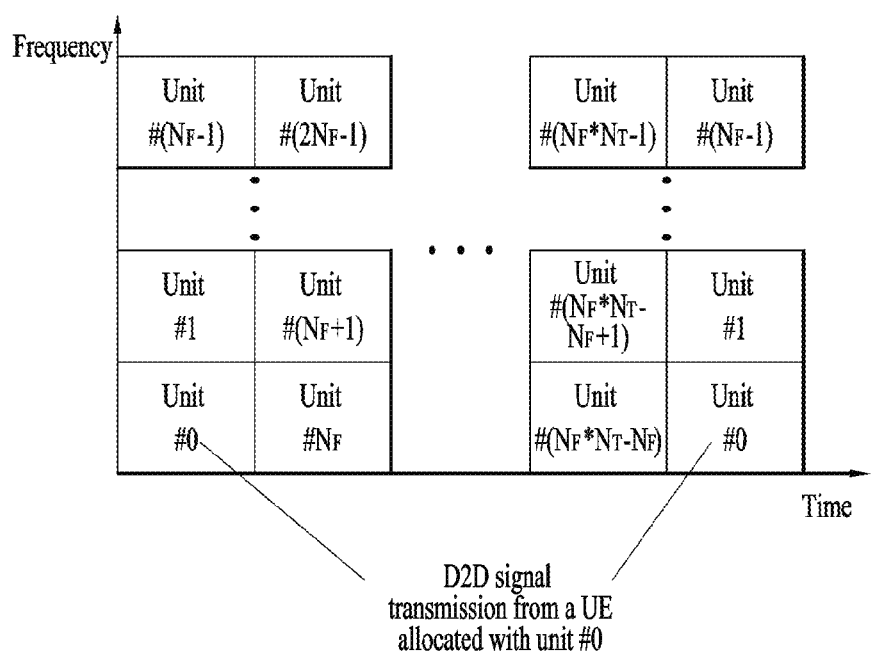
FIG. 13 is a diagram for explaining a resource configuration used in D2D communication.

3. Device to Device (D2D) Communication 3.1 Resource Configuration for D2D Communication In the following, a resource configuration used in D2D communication is explained. FIG. 13 is a diagram for explaining a resource configuration used in D2D communication.

Figure 14:
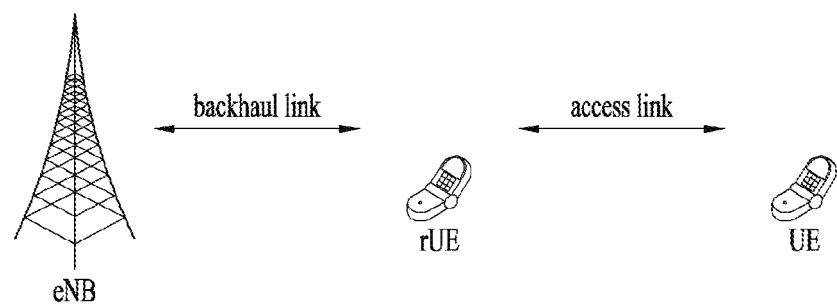
FIG. 14 is a diagram for explaining a relation among a base station, a relay UE, and a general UE as an example of D2D relay communication.

In general, a resource pool includes a plurality of resource units. A UE selects one or more resource units from among a plurality of the resource units and may be able to use the selected resource unit(s) for D2D communication. FIG. 14 shows a method of configuring a resource unit. Referring to FIG. 14, the entire frequency resource pool is divided into the $N_F$ number of resource units and the entire time resource pool is divided into the $N_T$ number of resource units. In particular, it is able to define $N_F*N_T$ number of resource units in total.

In this case, a resource pool can be repeated with a period of $N_T$ subframes. And, one resource unit can be periodically and repeatedly allocated in a resource pool. For instance, it is able to see that resource units #0, #1, . . . , and #(NF−1) are repeatedly allocated in a resource pool with a period of prescribed time. In particular, if a resource unit #0 is allocated to a UE, the UE is able to use all resource units indexed by the resource unit #0 in a resource pool.

And, the resource units in the resource pool or the resource pool itself can be configured to change an index of a physical resource unit to which a logical resource unit is mapped with a predetermined pattern according to time to obtain a diversity gain in time domain and/or frequency domain. In this resource unit structure, a resource pool may correspond to a set of resource units capable of being used for a UE intending to transmit and receive a D2D signal to transmit and receive the D2D signal.

In the embodiments of the present invention, a resource pool for D2D communication can be classified into various types. First of all, the resource pool can be classified according to content or a type of a D2D signal transmitted via each resource pool. For example, a D2D signal can be classified into an SA (scheduling assignment) signal, a D2D data channel signal, a discovery channel signal, and the like.

The SA signal may correspond to a signal including information on a resource position to which a D2D data channel for D2D communication is assigned, information on MCS (modulation and coding scheme) necessary for modulating and demodulating a D2D data channel, information on a MIMO transmission scheme, and/or information on a TA (timing advance), and the like. The SA signal can be independently transmitted on a prescribed resource unit or the SA signal and D2D data can be transmitted on an identical resource unit in a manner of being multiplexed. When the SA signal and the data are multiplexed, an SA resource pool may correspond to a set of resource units that an SA and D2D data are transmitted in a manner of being multiplexed. In the embodiments of the present invention, a resource unit on which an SA signal is transmitted can be referred to as an SA channel or a D2D control channel.

A D2D data channel can be defined as a set of resource units for transmitting and receiving a D2D data using a resource designated by UEs via SA. The D2D data channel can be multiplexed with an SA channel. And, in case of the D2D data channel, a D2D data signal can be multiplexed only without an SA signal.

In this case, when an SA signal and a D2D data channel are transmitted in a manner of being multiplexed on an identical resource unit, it may be able to configure the D2D data channel to be transmitted only to a resource pool for the D2D data channel except the SA signal. In other word, a resource unit used for transmitting SA information on an individual resource unit in an SA resource pool can also be used for transmitting D2D data in the resource pool for the D2D data channel The discovery channel may correspond to a set of resource units for transmitting a signal or a message that enables a neighboring UE to discover a UE configured to perform D2D communication. The UE configured to perform D2D communication transmits information such as an identifier of the UE, and the like to the neighboring UE to make the neighboring UE discover the UE.

In this case, an SA channel for transmitting an SA signal, a data channel for transmitting and receiving D2D data, and a discovery channel for transmitting and receiving a discovery signal can be configured in a single resource pool. Or, each of the SA channel, the D2D data channel, and the discovery channel can be configured by a separate resource pool.

Or, although contents of D2D signal are identical to each other, a different resource pool can be allocated according to a transmission/reception attribute of the D2D signal.

For example, although a D2D data channel and a discovery channel have a same type, the D2D data channel or the discovery channel can be configured by a different resource pool according to (1) a transmission timing determination scheme of a D2D signal (e.g., whether a D2D signal is transmitted at a timing at which a synchronization reference signal is received or a timing of which a prescribed TA is applied to the reception timing), (2) a resource allocation scheme (e.g., a resource for transmitting an individual signal is designated to an individual transmission UE by an eNB or the individual transmission UE autonomously selects a resource for transmitting an individual signal from a resource pool), (3) a signal format (e.g., the number of symbols occupied by a D2D signal in a subframe, the number of subframes for transmitting a D2D signal, etc.), (4) strength of a signal received from an eNB, and/or (5) transmit power strength of a D2D UE.

In the embodiments of the present invention, for clarity, a method for an eNB to directly schedule a resource region of a D2D transmission UE in D2D communication is defined as a mode 1. And, when a D2D transmission resource region is configured in advance or an eNB allocates the transmission resource region, a method for a UE to select a resource unit for D2D communication from the transmission resource region is defined as a mode 2.

In case of D2D discovery, a case of selecting a resource unit for D2D discovery directly selected by a UE from a predetermined resource region or a resource region indicated by an eNB is defined as a type 1. And, a case of scheduling a resource region for a discovery channel directly scheduled by an eNB is defined as a type 2.

In the embodiments of the present invention, channels for D2D communication can also be referred to as a sidelink. In this case, an SA channel is referred to as a physical sidelink control channel (PSCCH), a D2D synchronization signal is referred to as a sidelink synchronization signal (SLSS), and a control channel for broadcasting most basic system information for D2D communication can be referred to as a physical sidelink broadcast channel (PSBCH), respectively. The SLSS can also be named as a PD2DSCH (physical D2D synchronization channel). And, a channel for transmitting a D2D discovery signal can be defined as a physical sidelink discovery channel (PSDCH).

In LTE-A system (Rel-12, 13 or higher), a D2D communication UE is configured to transmit the PSBCH and the SLSS together or is configured to transmit the SLSS. And, the LTE-A system newly defines an S-RSRP (sidelink RSRP) to match synchronization with a different UE in D2D communication. In particular, when UEs intend to perform D2D communication, it may measure the S-RSRP and check UEs of which the S-RSRP is equal to or greater than a specific value. By doing so, it may be able to match synchronization of the UEs only and perform D2D communication. In this case, the S-RSRP can be measured from a DM-RS on the PSBCH. Yet, for a D2D relay operation, the S-RSRP can also be measured from a DM-RS on the PSDCH.

And, an out-coverage UE measures the S-RSRP based on DM-RS signal strength of the SLSS and/or the PSBCH/PSCCH/PSSCH to determine whether or not the S-RSRP becomes a synchronization source for performing a D2D relay operation of the out-coverage UE.

3.2 D2D Communication Scheme

In the embodiments of the present invention, device to device communication can be used in a manner of being mixed with such a term as D2D communication, direct communication between devices, and the like and has a same meaning. And, a UE corresponds to a terminal of a user in general. Yet, if such a network device as an eNB transceives a signal with a UE according to a communication scheme between the eNB and the UE, the eNB can also be regarded as a kind of UEs.

FIG. 14 is a diagram for explaining a relation among a base station, a relay UE, and a general UE as an example of D2D relay communication.

A rUE (relay-UE) corresponds to a UE operating as a relay to provide network connectivity to an out-of-coverage UE or a UE incapable of performing direct communication with an eNB. The rUE maintains not only a link with the eNB but also a link with a general UE and forwards information received from the eNB to the general UE or forwards information received from the general UE to the eNB. In this case, a link between the eNB and the rUE is defined as a backhaul link and a link between the rUE and the UE is defined as an access link, respectively. And, a link for performing direct communication between UEs without the involvement of the eNB can be defined as a D2D link.

Referring to FIG. 14, the rUE selects a resource unit corresponding to a specific resource from a resource pool corresponding to a set of resources for D2D communication and may be able to transmit a D2D signal using the selected resource unit. In this case, the D2D signal may correspond to a data signal transmitted and received for D2D communication and a data signal transceived between a general UE and an eNB via the rUE for relay communication.

A UE2 corresponds to a general UE. The UE2 receives a resource pool configuration from an eNB and/or a UE1 and can detect a D2D signal of the UE1 in the resource pool. In this case, if the UE1 is located within a connectivity range of the eNB, the eNB can inform the UE1 and/or the UE2 of information on the resource pool. Or, if the UE1 is located at the outside of the connectivity range of the eNB, a different UE can inform the UE1 and/or the UE2 of the information on the resource pool. Or, the resource pool can be configured by a predetermined resource in advance.

Figure 15:
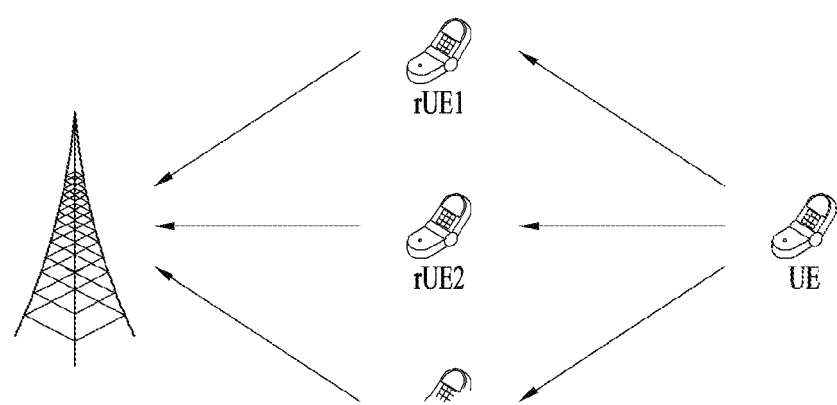
FIG. 15 is a diagram for a shape of D2D communication performed between a plurality of unspecified relay UEs and a general UE.

FIG. 15 is a diagram for a shape of D2D communication performed between a plurality of unspecified relay UEs and a general UE.

In case of performing D2D communication, one or more D2D relay UEs may exist. In particular, as mentioned in the foregoing description, when the S-RSRP is measured for UEs based on a DM-RS of DM-RS signal strength of the SLSS and/or the PSBCH/PSCCH/PSSCH, if the UEs have the S-RSRP equal to or greater than a prescribed level, the UEs may operate as a relay UE (rUE).

In this situation, if a plurality of rUEs successfully receive a UL signal transmitted by a general UE, which is incapable of performing direct communication with the eNB due to the out-coverage and the like, each of the rUEs individually forwards the information received from the general UE to the eNB. As shown in FIG. 15, if a UL signal transmitted by a UE is successfully received by a rUE1, a rUE2, and a rUE3, each of the rUE1, the rUE2, and the rUE3 forwards the information received from the UE to the eNB. In this case, since the information transmitted to the eNB by the rUEs is the same, if the same D2D data/signal received from the same UE is forwarded to the eNB by all rUEs, it may degrade resource efficiency.

A similar problem may occur not only in the UL transmission mentioned earlier in FIG. 15 but also in DL transmission. If the eNB triggers a D2D relay operation without designating a specific rUE, a plurality of rUEs, which have successfully received DL data, may unnecessarily relay the same data to a same target UE many times.

Hence, when relay transmission of UL/DL data is performed using a rUE, various methods for preventing retransmission of unnecessary duplicated data are proposed in the following.

4. Method for Preventing Duplicated Relay Transmission in D2D Communication 4.1 D2D Relay on the Basis of Signal Quality of Access Link An eNB can inform each of rUEs of a reference value in advance via a higher layer signal to make each of the rUEs determine a data for D2D communication to be relayed based on the reference value. For example, the eNB can configure the rUEs to relay data of UEs including signal quality equal to or greater than a prescribed reference value only based on signal quality. In particular, the eNB can assign a condition (i.e., reference value) for signal quality of an access link to each of the rUEs. Hence, an rUE measures the signal quality (e.g., RSRP or RSRQ) of the access link and may be able to determine data of signal quality equal to or greater than the preconfigured reference value as data to be relayed.

However, CRS (cell specific reference signal) transmission is not granted for D2D communication of the access link. In particular, a rUE performing D2D communication or a general UE is unable to use a CRS defined in a legacy LTE/LTE-A system when the rUE or the general UE measures signal quality such as RSRP or RSRQ. Hence, in case of D2D communication, the rUE or the UE can measure the signal quality of the access link from a DM-RS for transmitting SA or data.

In case of performing UL transmission, the rUE can relay a reception signal for an access link satisfying the condition to the eNB only. Or, in case of performing DL transmission, the rUE can relay a reception signal to a UE on an access link satisfying the condition only.

Figure 16:
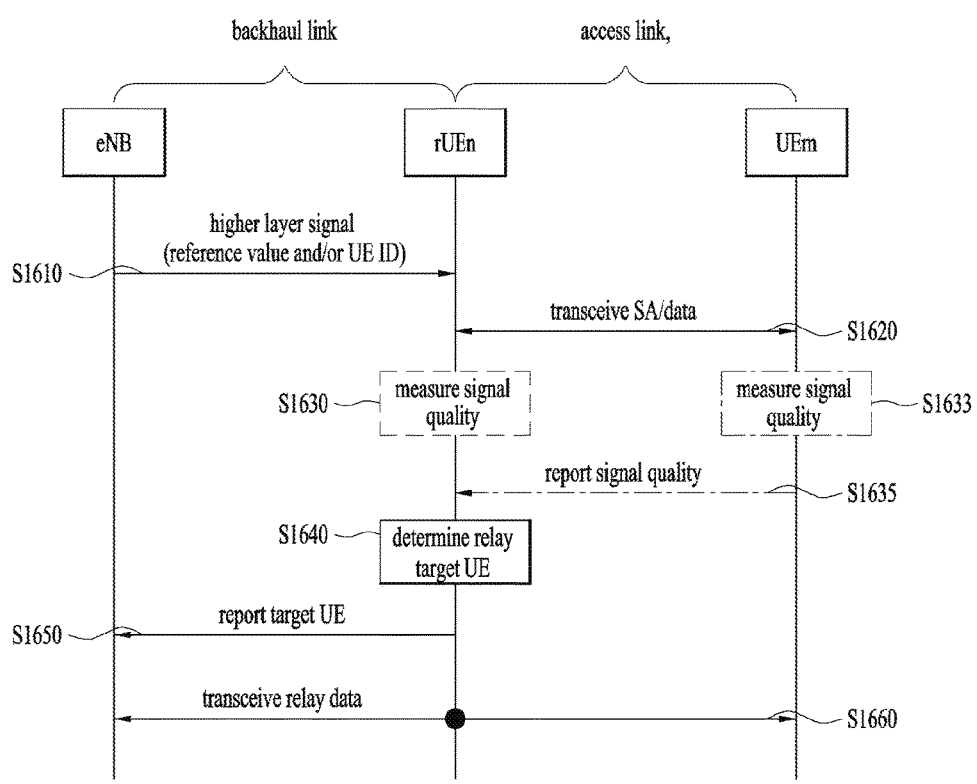
FIG. 16 is a flowchart for explaining a method of preventing duplicated relay transmission in D2D communication.

FIG. 16 is a flowchart for explaining a method of preventing duplicated relay transmission in D2D communication.

Referring to FIG. 16, assume a situation that an eNB, n number of relay UEs (rUEn), and m number of general UEs (UEm) are operating in a network system. In this case, rUE corresponds to a UE for supporting D2D relay and a link between the eNB and the rUE is defined as a backhaul link. A UE corresponds to a general UE located at the outside of the coverage of the eNB and the UE is incapable of performing direct communication with the eNB. In this case, the UE performs D2D communication with the eNB via the rUE or performs D2D direct communication with UEs near the UE. A link between the UE and the rUE is defined as an access link.

In order to determine a general UE to be relayed by the rUEn, the eNB can forward a reference value for measuring signal quality of the access link to the rUEn via a higher layer signal [S1610].

Yet, since a CRS is not transmitted in the access link, the rUEn is unable to measure signal quality based on the CRS. Hence, the rUE can measure the signal quality of the access link based on a UE-specific reference signal such as a DM-RS, a CSI-RS, or the like which is transmitted in a procedure of transceiving an SA signal or data with the UE [S1620, S1630].

The rUE can determine a relaying target UE based on the measured signal quality [S1640].

For example, assume that the eNB transmits a reference value x dBM for RSRP to the rUE, x+3 dB is measured for signal quality of an access link between a rUE1 and a UE1, and x−3 dB is measured for signal quality of an access link between the rUE1 and a UE2. In this case, since the signal quality of the access link between the rUE and the UE1 is equal to or greater than the reference value, the rUE1 selects data transceived with the UE1 as a D2D relay target. And, when signal quality between the rUE2 and the UE1 corresponds to x−2 dB and signal quality between the rUE2 and the UE2 corresponds to x+2 dB, the rUE2 selects data transceived with the UE2 as a D2D relay target and may be able to ignore data of the UE1. Of course, if the signal quality of the access link between the rUE2 and the UE1 equal to or greater than x dB is measured, the rUE2 can relay the data of the UE1 as well.

The rUEn can report relay target UEs to the eNB based on the signal quality measured in the steps S1620 and S1630 [S1650].

Basically, the rUEn transmits the target UEs to the eNB in the step S1650. Yet, the target UEs can be transceived between the rUEn. This is intended to prevent relay data from being duplicately transmitted.

Subsequently, the rUEn can transmit and receive D2D relay data [S1660].

As mentioned in the foregoing description, if D2D data for the access link including signal quality equal to or greater than a prescribed reference value is relayed only, it may be able to prevent the rUEn from duplicately transmitting D2D data to neighboring UEs.

As a different aspect of the present invention, it may be able to configure the signal quality measurement mentioned earlier in the step S1630 to be performed by a general UE. In particular, it is able to configure the UEm to measure signal quality with the rUEn [S1633] and report the signal quality to the rUEn [S1635].

4.2 D2D Relay on the Basis of Source Identifier and/or Destination Identifier

First of all, uplink (UL) transmission is explained.

An access link signal includes a source ID indicating a source UE, which have generated original data, and a destination ID indicating a destination eNB or a destination UE, which finally becomes a reception target of the data. In this case, the source ID or the destination ID may become a UE ID or an eNB ID. If a source or a destination is configured by a group of two or more devices, the source ID or the destination ID can be used for identifying the group.

Hence, it is able to configure the eNB to forward a list of source IDs and/or destination IDs to each rUE via a higher layer signal and it is able to configure a rUE to relay an access link signal included in the list only.

Figure 17:
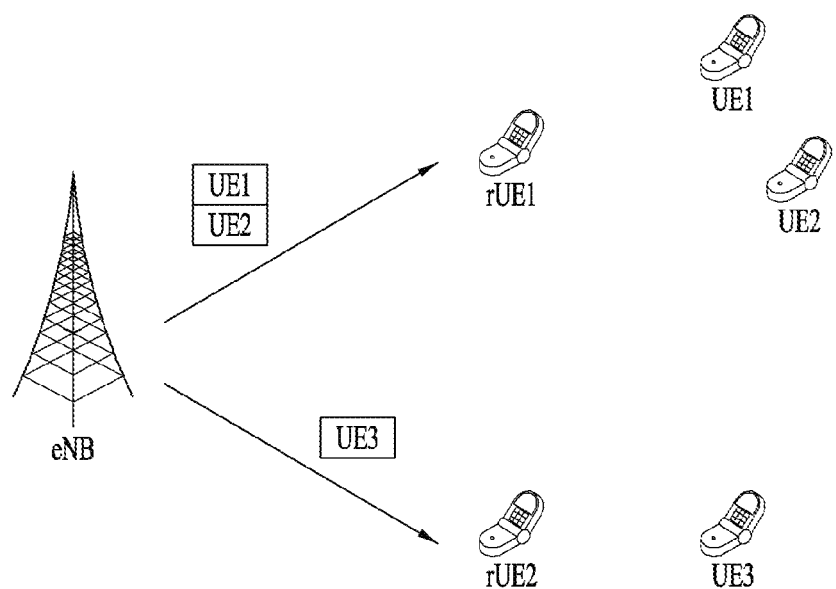
FIG. 17 is a diagram for a method of performing D2D relay on the basis of an identifier.

FIG. 17 is a diagram for a method of performing D2D relay on the basis of an identifier.

Referring to FIG. 17, when UL transmission is performed, an eNB forwards source IDs of a UE1 and a UE2 to a rUE1 via a higher layer signal and forwards a source ID of a UE3 to a rUE2. In this case, if a source ID included in D2D data corresponds to the UE1 and the UE2, relay can be performed in the rUE1. If a source ID corresponds to the UE3, relay can be performed in the rUE2. In this case, the rUE1 can ignore D2D data received from the UE3 without relaying the D2D data.

As a method of providing support to determine a list of source IDs and/or destination IDs of the eNB, a rUEn can forward a list of D2D UEs located near the rUEn, a list of UEm discovered by a discovery procedure, and a list of UEs currently performing direct D2D communication with the rUEn to the eNB.

In the following, downlink (DL) transmission is explained.

A backhaul link signal includes an ID indicating a source UE or a source eNB, which has generated original data, and an ID indicating a destination UE, which finally becomes a reception target of the data. It is able to configure the eNB to forward a list of source IDs and/or destination IDs to a rUEn and it is able to configure the rUEn to relay a backhaul link signal included in the list only.

When the eNB indicates a specific rUEn to relay a signal to a specific destination, if the rUEn discovers that a destination UE does not exist within a communication area of the rUEn, (for example, if a D2D signal (e.g., SA signal, a discovery signal, or other D2D data signal) transmitted by the destination UE is not received for more than prescribed time or, although the signal is received, if signal quality of the received signal is equal to or less than a prescribed level), the rUEn can omit D2D relay relayed to the destination UE. Or, the rUEn may report the fact to the eNB to make the eNB readjust a list of UEs to be relayed.

4.3 D2D Relay on the Basis of Signal Quality and Identifier

It may be able to configure data to be relayed by a rUEn to be determined by combining the methods mentioned earlier in the paragraphs 4.1 and 4.2.

For example, referring back to FIG. 16, the eNB can transmit not only a reference value for signal quality of an access link but also a source ID and/or a destination ID to each rUEn via a higher layer signal in the step S1610.

In this case, although the rUEn measures signal quality in the step S1630 and receives a D2D signal of the access link satisfying the reference value, if the source ID or the destination ID included in the D2D signal is not matched with the ID received in the step S1610, the rUEn may not relay the D2D signal. On the contrary, although the rUEn receives a D2D signal satisfying a reference of the source ID and/or the destination ID, if the signal quality of the access link does not satisfy a reference value, the rUEn may not relay the D2D signal. In particular, the rUEn can determine a D2D signal of which channel quality of an access link is equal to or greater than a reference value in the step S1640 and the D2D signal matched with the source ID and/or the destination ID configured by the eNB as a relay target only.

For example, referring back to FIG. 17, if the UE2 is getting far from the rUE1, it may fail to satisfy a reference value for signal quality. In this case, the rUE1 may not relay a D2D signal received from the UE2 to the eNB.

The above-mentioned operation can be identically applied to DL transmission as well.

As a different aspect of the present invention, in the paragraphs 4.1 to 4.3, the reference value and the ID for determining a D2D signal to be relayed by the rUEn can be informed via a physical layer signal rather than a higher layer signal. For example, the eNB may ask the rUEn to relay specific D2D data by transmitting an RNTI-based DCI of a specific rUEn to the rUEn.

4.4 Relay Determination Via Coordination Between rUEs

In the following, a method for a rUE to determine a signal received from a UE to be delayed via coordination between rUEs without a help of an eNB is explained as an embodiment of the present invention.

Figure 18:
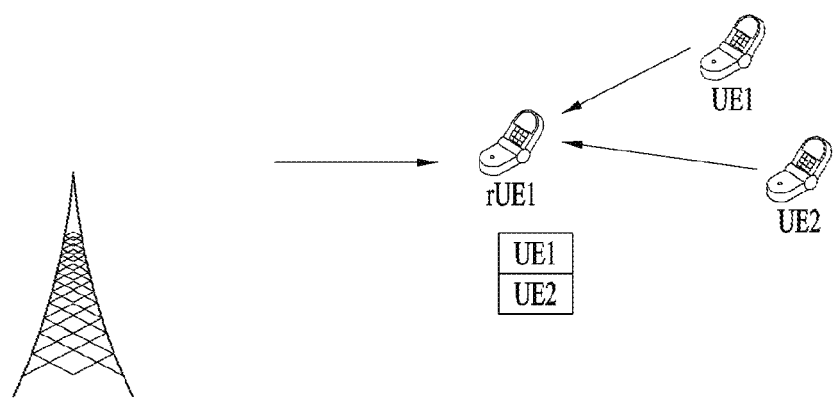
FIG. 18 is a diagram for a method of determining D2D relay via coordination between relay UEs.

FIG. 18 is a diagram for a method of determining D2D relay via coordination between relay UEs.

For example, a rUE forwards information on an access link to be relayed by the rUE to a different rUE and the different rUE can perform relay in a manner of excluding the link included in the information on the access link. In this case, the information on the access link to be relayed by the rUE can be configured based on a source ID and/or signal quality.

Referring to FIG. 18, if a rUE1 determines to relay data of a UE1 and a UE2 based on a reference such as signal quality or the like, the rUE1 can forward access link information including source IDs of the UE1 and the UE2 to rUEs. Having received the access link information from the rUE1, an rUE2 does not relay data, although the rUE2 has successfully received the data from the UE1 or the UE2.

Figure 19:
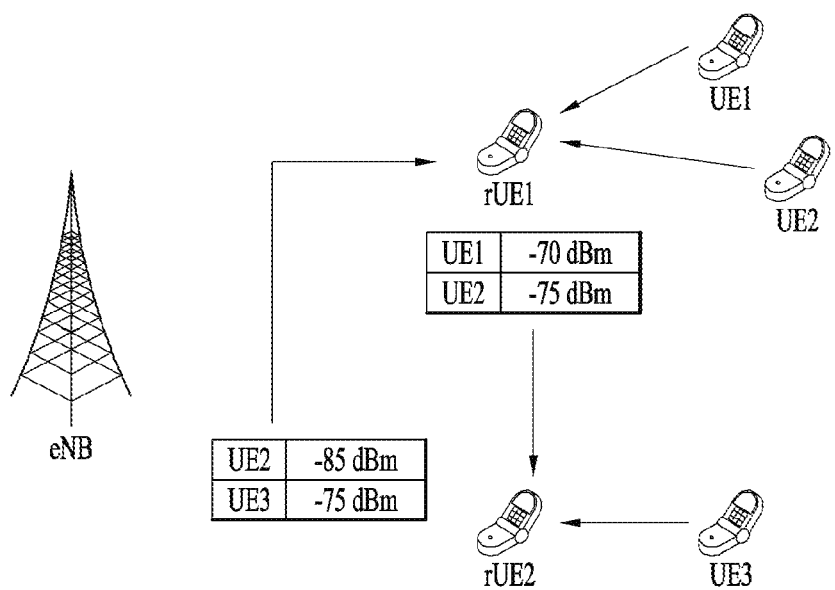
FIG. 19 is a diagram for a different method of determining D2D relay via coordination between relay UEs.

FIG. 19 is a diagram for a different method of determining D2D relay via coordination between relay UEs.

As a different aspect of the present invention, rUEs transceive a list of UEs discovered by the rUEs with each other to obtain information on UEs located near the rUEs. And, the list can further include not only IDs of the UEs discovered by the rUEs but also information on signal quality such as RSRP or RSRQ of an access link of the UEs.

In particular, the rUEs exchange the list of discovered UEs with each other to determine UEs to be relayed on the basis of the RSRP or the RSRQ information. If RSRP of an access link between the rUE2 and the UE informed by the rUE2 is greater than RSRP measured by the rUE1, the rUE1 may not relay a UE capable of being relayed by the rUE1. If the RSRP of the access link between the rUE2 and the UE informed by the rUE2 is less than the RSRP measured by the rUE1, the rUE1 can perform relay. Or, if the rUE2 does not inform the rUE1 of RSRP value of a UE capable of being relayed by the rUE1, the rUE1 can relay the UE.

Referring to FIG. 19, the rUE1 and the rUE2 can exchange the list of UEs discovered by the rUE1 and the rUE2 with each other. In this case, a list of UEs generated by the rUE1 can include source IDs of the UE1 and the UE2 and access link signal quality information on the UEs. And, a list of UEs generated by the rUE2 can include source IDs of the UE2 and the UE3 and access link signal quality information on the UEs.

In this case, since the list of UEs received from the rUE2 does not include the source ID of the UE1 and the RSRP value, the rUE1 performs relay on the UE1. And, since RSRP between the rUE1 and the rUE2 corresponds to −75 dBm and RSRP between the rUE2 and the UE2 corresponds to −85 dBm, a D2D signal for the UE2 can be relayed by the rUE1. Hence, the rUE2 can relay a D2D signal for the UE3 only. By doing so, it may be able to prevent relay of duplicated data.

Figure 20:
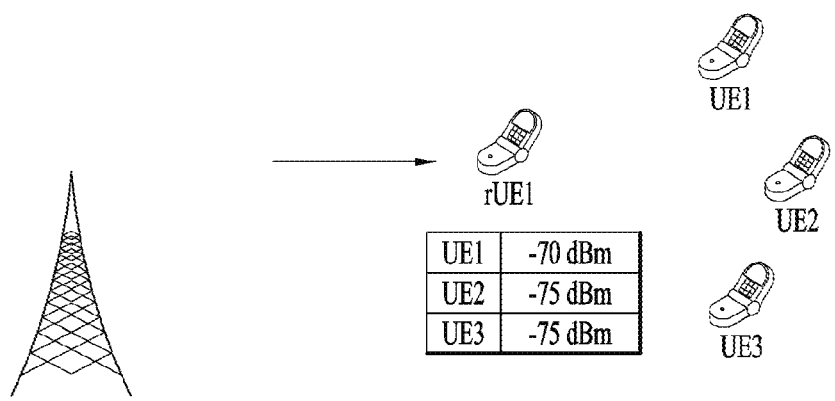
FIG. 20 is a diagram for a further different method of determining D2D relay via coordination between relay UEs.

FIG. 20 is a diagram for a further different method of determining D2D relay via coordination between relay UEs.

When it is configured to perform relay on a UE of which RSRP is greater all the time, as shown in FIG. 20, if a plurality of UEs are crowded in the vicinity of a rUE1, data of all of a plurality of the UEs should be relayed to an eNB from the rUE1. In this case, power consumption of the rUE1 increases. When data is transmitted to the UEs, delay may increase as well Hence, if ID information of many UEs is included in a list of UEs, although an RSRP value for a specific access link is poor, it may be able to configure relay to be performed to distribute load.

Referring to FIG. 20, a list of UEs generated by the rUE1 can include source IDs of the UE1, the UE2 and the UE3 and RSRP values for access links. And, a list of UEs generated by the rUE2 can include a source ID of the UE3 and an RSRP value for an access link.

In this case, according to the method mentioned earlier in FIG. 19, the rUE1 performs relay on a D2D signal for the UE3. Yet, since the rUE1 already relays D2D signals for the UE1 and the UE2, a burden of the rUE1 increases. Hence, in this case, it is able to configure the D2D signal for the UE3 to be relayed by the rUE2.

Yet, in order to determine a UE to be relayed by the rUE2, the eNB can transmit another reference value (second reference value). For example, the eNB not only transmits a reference value (first reference value) for selecting an access link to perform D2D relay but also configures the rUE2 to relay D2D signals within a prescribed reference value (i.e., second reference value) to prevent delay when duplicated UE exists in the list of UEs. The second reference value is represented by a difference value or an absolute value of the first reference value. Although signal quality related to the rUE2 is worse than signal quality of the rUE1, if complexity of the rUE1 is high and the signal quality corresponds to the second reference value, the rUE2 can relay D2D data for the UE3.

And, in case of the rUE1, if coordination between rUEs is performed based on the first reference value and there exists rUE (e.g., rUE3) not performing relay, it may be able to configure the rUE3 to perform relay by applying the first reference value and the second reference value to the rUE3.

The methods mentioned earlier in the paragraphs 4.4 can be identically applied to DL communication as well as UL communication.

In this case, the eNB can commonly transmit DL data to a plurality of rUEs rather than a specific rUE. For example, it is able to utilize DCI for a plurality of the rUEs based on a common RNTI.

And, the methods mentioned earlier in the paragraphs 4.4 can also be applied to relay between UEs that information is directly forwarded from a rUE to a different UE.

4.5 Relay Determination Via Overhearing Between rUEs

According to the embodiments mentioned earlier in the paragraphs 4.1 to 4.4, it is necessary to determine data to be relayed by each rUE via coordination between an eNB and a rUE or between rUEs before an actual D2D signal is relayed. Hence, signaling overhead may increase in a network.

In order to solve the signaling overhead problem, a method of determining whether to relay without a separate coordination process is proposed in the following. The method can be performed in a manner that each rUE overhears a signal transmitted to other rUEs before a D2D signal received from a UE is relayed.

Figure 21:
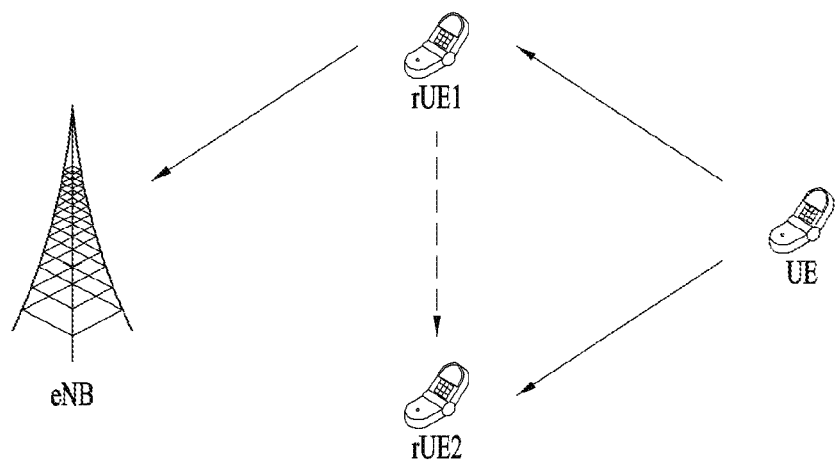
FIG. 21 is a diagram for a method of determining a relay UE via overhearing between rUEs.

FIG. 21 is a diagram for a method of determining a relay UE via overhearing between rUEs.

When UL transmission is performed, in order for a rUE1 to overhear transmission on an UL data channel (e.g., PUSCH) of other rUEs, the rUE1 should be aware of scheduling information (e.g., resource allocation information and/or MCS) on the rUEs.

If scheduling of the rUEs is semi-statically performed, the rUE1 overhears higher layer signaling to obtain the scheduling information on the rUEs.

If scheduling of the rUEs is dynamically performed, all rUEs receive DCI transmitted on a common search space to obtain the scheduling information on the rUEs. In particular, the rUE1 can obtain the scheduling information on the rUEs by utilizing a structure similar to a UL grant on a random access response.

Referring to FIG. 21, when a UL data transmitted from a UE is successfully received by the rUE1 and the rUE2, it is able to check that the rUE1 preferentially relays the UL data to the eNB prior to the rUE2. In this case, the rUE2 overhears the data relayed by the rUE1. If it is determined that the data is identical to data to be relayed by the rUE2, the rUE2 may not relay the data.

A reference for determining the identical data can be determined after all data are decoded. Or, a source ID and/or a destination ID and/or a frame number included in a header for transmitting each data may become the reference.

As a different aspect of the present embodiment, the rUE2 can determine whether to perform relay based on signal quality of the overheard relay data. For example, the rUE2 overhears the relay data transmitted from the rUE1 before the data received from the UE is relayed. Although it is determined that the data are identical to each other, the rUE2 can determine whether to perform relay by comparing RSRP (or RSRQ) of the overheard relay data with a reference value (determined in advance via higher layer signal).

For example, referring to FIG. 21, the rUE2 can overhear data relayed by the rUE1. The rUE2 can check that the rUE2 relays the same D2D data received from a UE identical to the rUE1 via overhearing. In this case, if it is determined as RSRPs of the rUE1 and the UE are greater than a reference value, the rUE2 is able to assume that the coverage of the rUE1 is similar to the coverage of the rUE2. Hence, the rUE2 may not relay D2D data for the UE.

The reference value for the RSRP (or RSRQ) can be configured by a different value depending on a type of communication (unicast communication and groupcast/broadcast communication). For example, in case of the unicast communication, the RSRP reference value can be configured by a value higher than the RSRP reference value of the groupcast/broadcast communication. This is because, due to the characteristic of the groupcast/broadcast communication, it is profitable to transmit data to UEs as many as possible.

And, referring to FIG. 21, if a specific rUE among the rUE1 and the rUE2 continuously performs relay, power of the specific rUE is considerably consumed. In order to solve the power consumption problem, when the rUE receives data from the UE1, the rUE may attempt to perform D2D data relay after a random backoff.

As a different aspect of the present embodiment, the methods mentioned earlier in the paragraph 4.5 can also be applied to DL communication. In this case, overhearing transmission of other rUEs may indicate to overhear D2D communication of an access link. For example, in terms of a rUE, if an SA ID detected by blind decoding of SA is identical to an SA ID of relay data of the rUE, it is able to detect and decode the SA and may be able to overhear DL data scheduled by the SA. In this case, as mentioned in the foregoing description, whether or not the data are identical to each other can be determined after all data are decoded or can be determined based on a resource ID and/or a destination ID and/or a frame number included in a data header.

4.6 Method of Configuring SFN

In the following, a method for a plurality of rUEs to perform relay at the same time by configuring a single frequency network (SFN) is explained.

Referring back to FIG. 15, D2D data on a single UE can be relayed by a plurality of rUEn. In particular, as shown in FIG. 15, if a signal transmitted by a UE is successfully received by a plurality of rUEs at the same time, a plurality of the rUEs configure an SFN and may be able to attempt to perform relay at the same time.

In this case, an eNB can inform each rUE of scheduling information such as resource allocation information (e.g., subframe information or resource block position information), MCS, and the like via a higher layer signal or the scheduling information can be shared between rUEs via cooperation. In particular, in the situation shown in FIG. 15, a rUE1, a rUE2 and a rUE3 configure an SFN by utilizing a previously allocated resource region and may be able to perform relay at the same time.

The paragraph 4.6 can be applied to DL communication or UE-UE relay communication directly delivering information from a rUE to a different UE rather than UL communication.

5. Apparatus

Figure 22:
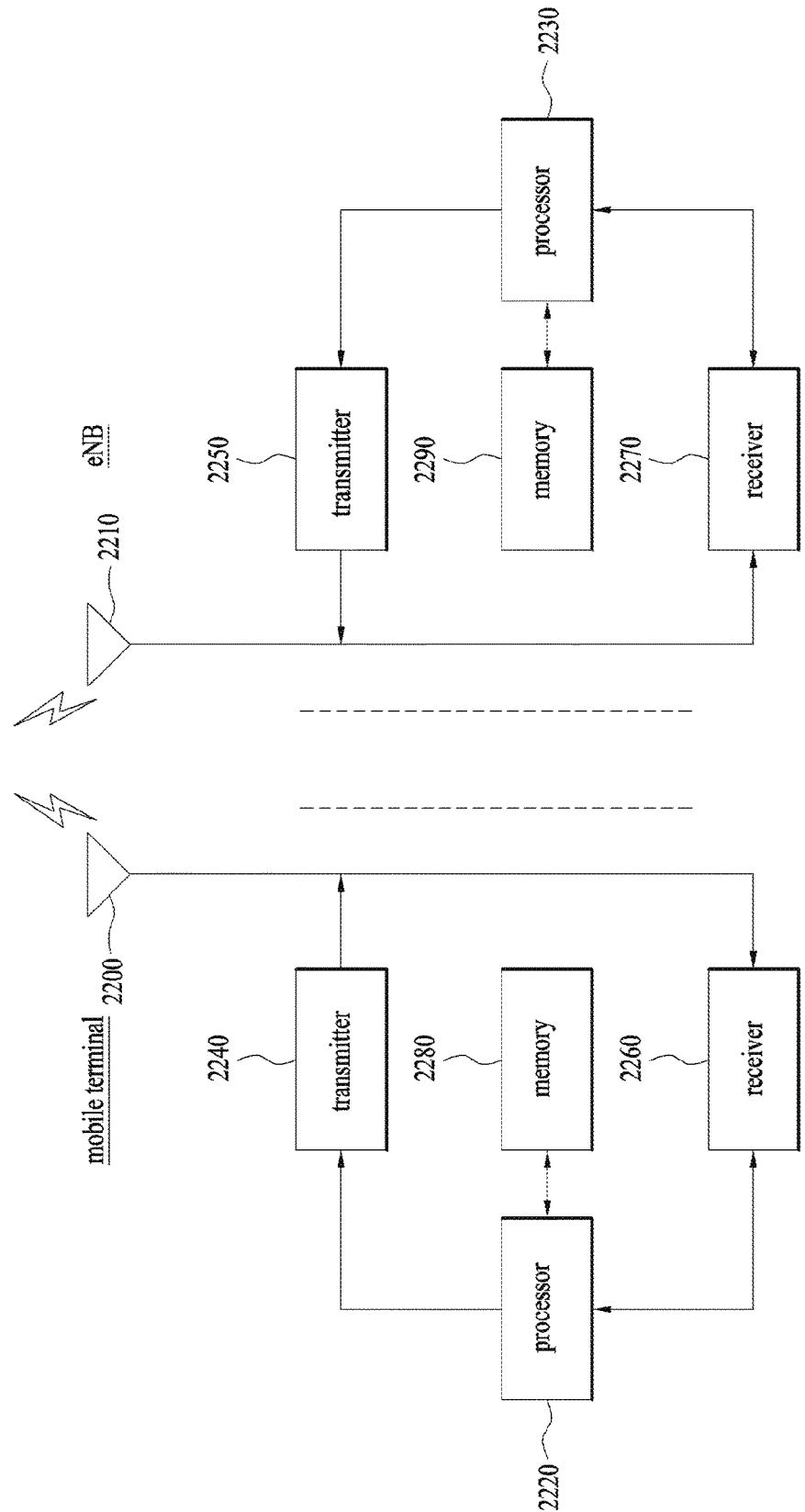
FIG. 22 is a diagram for a device capable of implementing the methods described in FIGS. 1 to 21.

Apparatuses illustrated in FIG. 22 are means that can implement the methods described before with reference to FIGS. 1 to 21.

A UE may act as a transmitter on a UL and as a receiver on a DL. An eNB may act as a receiver on a UL and as a transmitter on a DL.

That is, each of the UE and the eNB may include a transmitter 2240 or 2250 and a receiver 2260 or 2270, for controlling transmission and reception of information, data, and/or messages, and an antenna 2200 or 2210 for transmitting and receiving information, data, and/or messages.

Each of the UE and the eNB may further include a processor 2220 or 2230 for implementing the afore-described embodiments of the present disclosure and a memory 2280 or 2290 for temporarily or permanently storing operations of the processor 2220 or 2230.

The embodiments of the present invention can be performed using the aforementioned general UE, the relay UE, and configuration element and functions of the eNB. For example, a processor of the relay UE controls a receiver to receive a higher layer signal or a physical layer signal including such a reference value as RSRP, RSRQ, and the like and/or a source/destination ID and may be able to measure signal quality of an access link using the receiver. The relay UE can select data to be relayed, a link, and a UE based on the measured signal quality and/or the source/destination ID and may be able to relay a D2D signal to the eNB or the general UE. For details, it may refer to the paragraphs 3 and 4.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2280 or 2290 and executed by the processor 2220 or 2230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of efficiently relaying a D2D signal, which is relayed by a relay user equipment (UE) in a wireless access system supporting device to device (D2D) communication, the method performed by the relay UE and comprising:
   receiving, from an evolved Node-B (eNB), a higher layer signal including a reference value for measuring signal quality;
   measuring signal quality of access links;
   selecting, among the access links, a first access link based on the reference value; and
   relaying the D2D signal based on the first access link,
   wherein the access links are for links between the relay UE and other general UEs;
   wherein the relay UE exchanges first access link information including a UE identifier and signal quality related to the first access link, with second access link information of a second relay UE including a UE identifier and signal quality related to a second access link of the second relay UE, and
   wherein the second relay UE is a UE different from the first relay UE.

2. The method of claim 1, wherein the signal quality is measured based on a UE-specific reference signal transmitted from the access links.

3. The method of claim 1, wherein the higher layer signal further includes at least one of a source identifier or a destination identifier.

4. The method of claim 3, wherein, when performing uplink transmission, the relay UE relays only a D2D signal for a UE, the source identifier of which is matched among the first access link.

5. The method of claim 3, when performing downlink transmission, the relay UE relays only a D2D signal for a UE, the destination identifier of which is matched among the first access link.

6. The method of claim 1, wherein the relay UE does not relay a D2D signal for the second access link relayed by the second relay UE, based on the second access link information exchanged.

7. A relay user equipment (UE) efficiently relaying a D2D signal in a wireless access system supporting device to device (D2D) communication, the relay UE comprising:
   a transmitter;
   a receiver; and
   a processor configured to support the relay of the D2D signal, and configured to:
   control the receiver to receive, from an evolved Node-B (eNB), a higher layer signal containing a reference value for measuring signal quality;
   measure signal quality of access links;
   select, among the access links, a first access link based on the reference value; and
   relay the D2D signal based on the first access link,
   wherein the access links are for links between the relay UE and other general UEs;
   wherein the relay UE exchanges first access link information including a UE identifier and signal quality related to the first access link, with second access link information of a second relay UE including a UE identifier and signal quality related to a second access link of the second relay UE, and
   wherein the second relay UE is a UE different from the first relay UE.

8. The relay UE of claim 7, wherein the signal quality is measured based on a UE-specific reference signal transmitted from the access links.

9. The relay UE of claim 7, wherein the higher layer signal further includes at least one of a source identifier or a destination identifier.

10. The relay UE of claim 9, wherein, when performing uplink transmission, the relay UE relays only a D2D signal for a UE, the source identifier of which is matched among the first access link.

11. The relay UE of claim 9, wherein, when performing downlink transmission, the relay UE relays only a D2D signal for a UE, the destination identifier of which is matched among the first access link.

12. The relay UE of claim 7, wherein the relay UE does not relay a D2D signal for the second access link relayed by the second relay UE, based on the second access link information exchanged.

* * * * *